United States Patent
Yang

(10) Patent No.: US 12,237,783 B1
(45) Date of Patent: Feb. 25, 2025

(54) DEAD-TIME COMPENSATION METHOD AND APPARATUS FOR PERMANENT MAGNET SYNCHRONOUS MOTOR, DEVICE, AND STORAGE MEDIUM

(71) Applicant: Hua Yang, Shanghai (CN)

(72) Inventor: Hua Yang, Shanghai (CN)

(*) Notice: Subject to any disclaimer, the term of this patent is extended or adjusted under 35 U.S.C. 154(b) by 0 days.

(21) Appl. No.: 18/763,985

(22) Filed: Jul. 3, 2024

(30) Foreign Application Priority Data

Apr. 29, 2024 (CN) .......................... 202410528986.3

(51) Int. Cl.
| | |
|---|---|
| *H02P 21/14* | (2016.01) |
| *H02P 21/00* | (2016.01) |
| *H02P 21/22* | (2016.01) |
| *H02P 25/022* | (2016.01) |

(52) U.S. Cl.
CPC .......... *H02P 21/14* (2013.01); *H02P 21/0003* (2013.01); *H02P 21/22* (2016.02); *H02P 25/022* (2013.01)

(58) Field of Classification Search
CPC ...... H02P 21/14; H02P 21/22; H02P 21/0003; H02P 25/022; H02P 21/05; H02P 27/12; H02P 21/13; H02M 1/385; B62D 5/00
See application file for complete search history.

(56) References Cited

U.S. PATENT DOCUMENTS

| | | | |
|---|---|---|---|
| 2014/0042938 A1* | 2/2014 | Shoji | H02P 21/0089 318/400.02 |
| 2015/0145459 A1* | 5/2015 | Guzelgunler | H02P 27/04 318/490 |
| 2019/0252971 A1* | 8/2019 | Kim | H02M 1/32 |

(Continued)

FOREIGN PATENT DOCUMENTS

| | | | |
|---|---|---|---|
| CN | 103684179 A | * | 3/2014 |
| CN | 110071669 A | | 7/2019 |
| CN | 114744939 A | | 7/2022 |
| CN | 115833688 A | | 3/2023 |
| CN | 116260368 A | | 6/2023 |

* cited by examiner

OTHER PUBLICATIONS

Naomitsu Urasaki, Adaptive Dead-Time Compensation of Voltage Source Inverter for Variable Speed Drives, 2006, IEEJ, 872-879 (Year: 2006).*

*Primary Examiner* — Bickey Dhakal
(74) *Attorney, Agent, or Firm* — George D. Morgan

(57) ABSTRACT

The present disclosure relates to a dead-time compensation method and apparatus for a permanent magnet synchronous motor (PMSM), a device, and a storage medium. The method includes: acquiring current sampling time d-axis currents and current sampling time q-axis currents corresponding to current sampling time three-phase stator currents of the PMSM; acquiring, according to vector angles of current sampling time three-phase current vectors, current sampling time filtered d-axis currents, and current sampling time filtered q-axis currents, included angles between the current sampling time three-phase current vectors and the d-axis, and acquiring current sampling time angles θ of the current sampling time three-phase current vectors; acquiring polarities of the current sampling time three-phase stator currents according to the current sampling time angles θ; and acquiring current sampling time compensation voltage values according to the polarities of the current sampling time three-phase stator currents.

10 Claims, 6 Drawing Sheets

(56) References Cited

U.S. PATENT DOCUMENTS

2020/0382032 A1* 12/2020 Takase .................... H02P 21/05
2021/0214000 A1* 7/2021 Miki ....................... H02P 21/06

DEAD-TIME COMPENSATION METHOD AND APPARATUS FOR PERMANENT MAGNET SYNCHRONOUS MOTOR, DEVICE, AND STORAGE MEDIUM

CROSS-REFERENCE TO RELATED APPLICATIONS

The application claims priority to Chinese patent application No. 2024105289863, filed on Aug. 29, 2024, the entire contents of which are incorporated herein by reference.

TECHNICAL FIELD

The present disclosure relates to the field of motors, and in particular to a dead-time compensation method and apparatus for a permanent magnet synchronous motor (PMSM), a device, and a storage medium.

BACKGROUND

PMSM uses a permanent magnet for excitation, providing a simple structure, high efficiency, and low noise. As a result, PMSM is widely employed in new energy vehicles, robots, household appliances, and other fields.

PMSM consists of components such as stator and rotor. To control the operation of the PMSM, it is essential to utilize an inverter to convert direct current (DC) into alternating current (AC).

To output an ideal current waveform, it is essential to control the switching devices (also known as power transistors, switching transistors, power switching transistors, and the like) of the inverter to turn on and/or off at higher switching frequencies through pulse width modulation (PWM) current/voltage. In an ideal case, the two switching transistors of the upper and lower bridge arms of the same phase in the inverter operate in a complementary state. However, in practical applications, due to a charge storage effect, there is a certain delay in switching the switching transistors. Particularly, the turn-off duration is longer than the turn-on duration. Therefore, during the commutation process of the two switching transistors of the same bridge arm, one switching transistor may have been turned on while the other has not been turned off, leading to potential damage to both switching transistors due to direct conduction.

To prevent damage to the two switching transistors, a certain dead-time needs to be introduced between the turn-on and turn-off moments of the two switching transistors. The dead-time and the non-linear characteristics of the switching transistor itself are referred to as the dead-time effect. One cycle consists of one turn-off and one turn-on of the switching transistor. The output voltage error caused by the dead-time effect within a single cycle is minimal. However, the cumulative effect of the dead-time cannot be overlooked due to the high switching frequency of the switching transistor. The dead-time effect can result in stator current distortion and torque ripple, leading to motor noise, output deviation, and other issues. Therefore, it is necessary to compensate for the dead-time effect.

The methods commonly used in the prior art to compensate for the dead-time effect typically include fixed compensation methods, observer-based compensation methods, and the like. The former is simple to implement, but the compensation value is fixed, which may lead to over-compensation or under-compensation, resulting in poor compensation effectiveness. The latter can provide real-time estimation of the dead-time effect for more precise compensation. However, it demands a high-quality observer, which is sensitive to noise and interference, leading to increased costs and reduced stability of the method.

The dead-time compensation methods in the prior art are not perfect.

SUMMARY

To solve, or at least partially solve, the above technical problem, the present disclosure provides a dead-time compensation method and apparatus for a PMSM, a device, and a storage medium.

In a first aspect, the present disclosure provides a dead-time compensation method for a PMSM, the method including:

acquiring current sampling time d-axis currents and current sampling time q-axis currents corresponding to current sampling time three-phase stator currents of the PMSM, where the d-axis and the q-axis are coordinate axes in a dq coordinate system, the current sampling time d-axis currents are components of the current sampling time three-phase stator currents in the d-axis, and the current sampling time q-axis currents are components of the current sampling time three-phase stator currents in the q-axis;

performing low-pass filtering on the current sampling time d-axis currents and the current sampling time q-axis currents to obtain current sampling time filtered d-axis currents and current sampling time filtered q-axis currents;

acquiring, according to vector angles of current sampling time three-phase current vectors, the current sampling time filtered d-axis currents, and the current sampling time filtered q-axis currents, included angles between the current sampling time three-phase current vectors and the d-axis;

acquiring current sampling time angles θ of the current sampling time three-phase current vectors in an αβ coordinate system according to the included angles between the current sampling time three-phase current vectors and the d-axis;

acquiring polarities of the current sampling time three-phase stator currents according to the current sampling time angles θ; and acquiring current sampling time compensation voltage values according to current sampling time pre-compensation voltage values, current sampling time pre-compensation PWM duty ratios, a current sampling time compensation PWM duty ratio, and the polarities of the current sampling time three-phase stator currents.

Optionally, the performing low-pass filtering on the current sampling time d-axis currents and the current sampling time q-axis currents to obtain current sampling time filtered d-axis currents and current sampling time filtered q-axis currents includes:

acquiring d-axis filtering coefficients of d-axis low-pass filters;

acquiring last sampling time filtered d-axis currents output by the d-axis low-pass filters;

obtaining the current sampling time filtered d-axis currents output by the d-axis low-pass filters according to the last sampling time filtered d-axis currents, the current sampling time d-axis currents, and the d-axis filtering coefficients;

acquiring q-axis filtering coefficients of q-axis low-pass filters;

acquiring last sampling time filtered q-axis currents output by the q-axis low-pass filters; and obtaining the current sampling time filtered q-axis currents output by the q-axis low-pass filters according to the last sampling time filtered q-axis currents, the current sampling time q-axis currents, and the q-axis filtering coefficients.

Optionally, the obtaining the current sampling time filtered d-axis currents output by the d-axis low-pass filters according to the last sampling time filtered d-axis currents, the current sampling time d-axis currents, and the d-axis filtering coefficients includes:

calculating the current sampling time filtered d-axis currents according to a first equation, the first equation being:

$$Yd(n)=ad*Xd(n)+(1-ad)*Yd(n-1),$$

where Yd(n) is the current sampling time filtered d-axis current; Xd(n) is the current sampling time d-axis current; Yd(n−1) is the last sampling time filtered d-axis current; and ad is the d-axis filtering coefficient; and calculating the current sampling time filtered q-axis currents according to a second equation, the second equation being:

$$Yq(n)=aq*Xq(n)+(1-aq)*Yq(n-1),$$

where Yq(n) is the current sampling time filtered q-axis current; Xq(n) is the current sampling time q-axis current; Yq(n−1) is the last sampling time filtered q-axis current; and aq is the q-axis filtering coefficient.

Optionally, before the acquiring, according to vector angles of current sampling time three-phase current vectors, the current sampling time filtered d-axis currents, and the current sampling time filtered q-axis currents, included angles between the current sampling time three-phase current vectors and the d-axis, the method further includes:

acquiring the current sampling time three-phase current vectors, where vector values of the current sampling time three-phase current vectors are values of the current sampling time three-phase stator currents, and the vector angles of the current sampling time three-phase current vectors are current sampling time rotor angles of the PMSM.

Optionally, the acquiring, according to vector angles of current sampling time three-phase current vectors, the current sampling time filtered d-axis currents, and the current sampling time filtered q-axis currents, included angles between the current sampling time three-phase current vectors and the d-axis includes:

calculating the included angles between the current sampling time three-phase current vectors and the d-axis according to a third equation, the third equation being:

$$\psi=\arctan(i_d/i_q),$$

where $\psi$ is the included angle between the current sampling time three-phase current vector and the d-axis; $i_d$ is the current sampling time filtered d-axis current; and $i_q$ is the current sampling time filtered q-axis current.

Optionally, the acquiring current sampling time angles θ of the current sampling time three-phase current vectors in an αβ coordinate system according to the included angles between the current sampling time three-phase current vectors and the d-axis includes:

calculating the current sampling time angles θ of the current sampling time three-phase current vectors in the αβ coordinate system according to a fourth equation, the fourth equation being:

$$\theta=\psi+\omega,$$

where $\psi$ is the included angle between the current sampling time three-phase current vector and the d-axis; and $\omega$ is a current sampling time rotor angle of the PMSM.

Optionally, the acquiring polarities of the current sampling time three-phase stator currents according to the current sampling time angles θ includes:

acquiring angle and polarity correspondence; and acquiring the polarities of the current sampling time three-phase stator currents according to the current sampling time angles θ and the angle and polarity correspondence, the angle and polarity correspondence being:

in response to $$\frac{\pi}{6} \le \theta < \frac{\pi}{2},$$

the polarities of the current sampling time three-phase stator currents are positive, positive, and negative, respectively;

in response to $$\frac{\pi}{2} \le \theta < \frac{5\pi}{6},$$

the polarities of the current sampling time three-phase stator currents are negative, positive, and negative, respectively;

in response to $$\frac{5\pi}{6} \le \theta < \frac{7\pi}{6},$$

the polarities of the current sampling time three-phase stator currents are negative, positive, and positive, respectively;

in response to $$\frac{7\pi}{6} \le \theta < \frac{3\pi}{2},$$

the polarities of the current sampling time three-phase stator currents are negative, negative, and positive, respectively;

in response to $$\frac{3\pi}{2} \le \theta < \frac{11\pi}{6},$$

the polarities of the current sampling time three-phase stator currents are positive, negative, and positive, respectively;

in response to $$\frac{11\pi}{6} \leq \theta < 2\pi,$$

the polarities of the current sampling time three-phase stator currents are positive, negative, and negative, respectively; and
in response to $$0 \leq \theta < \frac{\pi}{6},$$

the polarities of the current sampling time three-phase stator currents are positive, negative, and negative, respectively.

Optionally, the current sampling time three-phase currents include $i_a$, $i_b$, and $i_c$; and the current sampling time compensation voltage values include: $\Delta_{ua}$ corresponding to $i_a$, $\Delta_{ub}$ corresponding to $i_b$, and $\Delta_{uc}$ corresponding to $i_c$; and
the acquiring current sampling time compensation voltage values according to current sampling time pre-compensation voltage values, current sampling time pre-compensation PWM duty ratios, a current sampling time compensation PWM duty ratio, and the polarities of the current sampling time three-phase stator currents includes:
calculating the current sampling time compensation voltage values according to a fifth equation, the fifth equation being:

$$\Delta_{ua} = U_{dca} * \frac{T_d}{T_{pwma}} * \text{sign}(i_a),$$

$$\Delta_{ub} = U_{dcb} * \frac{T_d}{T_{pwmb}} * \text{sign}(i_b),$$

$$\Delta_{uc} = U_{dcc} * \frac{T_d}{T_{pwmc}} * \text{sign}(i_c),$$

where $U_{dca}$ is the current sampling time pre-compensation voltage value corresponding to $i_a$; $T_{pwma}$ is the current sampling time pre-compensation PWM duty ratio corresponding to $i_a$; $T_d$ is the current sampling time compensation PWM duty ratio; and $\text{sign}(i_a)$ is used for characterizing a polarity of $i_a$, $i_a>0$ and $\text{sign}(i_a)>0$ in response to the polarity of $i_a$ being positive, and $i_a<0$ and $\text{sign}(i_a)<0$ in response to the polarity of $i_a$ being negative;
$U_{dcb}$ is the current sampling time pre-compensation voltage value corresponding to $i_b$; $T_{pwmb}$ is the current sampling time pre-compensation PWM duty ratio corresponding to $i_b$; and $\text{sign}(i_b)$ is used for characterizing a polarity of $i_b$, $i_b>0$ and $\text{sign}(i_b)>0$ in response to the polarity of $i_b$ being positive, and $i_b<0$ and $\text{sign}(i_b)<0$ in response to the polarity of $i_b$ being negative; and
$U_{dcc}$ is the current sampling time pre-compensation voltage value corresponding to $i_c$; $T_{pwmc}$ is the current sampling time pre-compensation PWM duty ratio corresponding to $i_c$; and $\text{sign}(i_c)$ is used for characterizing a polarity of $i_c$, $i_c>0$ and $\text{sign}(i_c)>0$ in response to the polarity of $i_c$ being positive, and $i_c<0$ and $\text{sign}(i_c)<0$ in response to the polarity of $i_c$ being negative.

Optionally, after the acquiring current sampling time compensation voltage values, the method further includes:
acquiring a current sampling time compensation voltage vector according to the current sampling time compensation voltage values;
acquiring two current sampling time compensation components of the current sampling time compensation voltage vector in the $\alpha\beta$ coordinate system; and
acquiring two current sampling time compensation control components in the $\alpha\beta$ coordinate system according to the two current sampling time compensation components.

Optionally, the acquiring a current sampling time compensation voltage vector according to the current sampling time compensation voltage values includes:
acquiring the current sampling time compensation voltage vector according to a sixth equation, the sixth equation being:

$$U = \frac{2}{3}\left[\text{sign}(i_a) + e^{j\frac{2}{3}\pi}\text{sign}(i_b) + e^{j\frac{4}{3}\pi}\text{sign}(i_c)\right],$$

where U is the current sampling time compensation voltage vector;
the acquiring two current sampling time compensation components of the current sampling time compensation voltage vector in the $\alpha\beta$ coordinate system includes:
acquiring the two current sampling time compensation components of the current sampling time compensation voltage vector in the $\alpha\beta$ coordinate system according to a seventh equation, the seventh equation being:

$$U_{\alpha p} = \frac{2}{3}\left[\text{sign}(i_a) - \frac{1}{2}\text{sign}(i_b) - \frac{1}{2}\text{sign}(i_c)\right],$$

$$U_{\beta p} = \frac{2}{3}\left[\frac{\sqrt{3}}{2}\text{sign}(i_b) - \frac{\sqrt{3}}{2}\text{sign}(i_c)\right],$$

where $U_{\alpha p}$ and $U_{\beta p}$ are the two current sampling time compensation components of the current sampling time compensation voltage vector in the $\alpha\beta$ coordinate system, respectively; and
the acquiring two current sampling time compensation control components in the $\alpha\beta$ coordinate system according to the two current sampling time compensation components includes:
acquiring the two current sampling time compensation control components in the $\alpha\beta$ coordinate system according to an eighth equation, the eighth equation being:

$$\Delta_{U_\alpha} = U_{dc} * \frac{2T_d}{T_{pwm1}} * U_{\alpha p},$$

$$\Delta_{U_\beta} = U_{dc} * \frac{2T_d}{T_{pwm1}} * U_{\beta p},$$

where $\Delta_{U_\alpha}$ and $\Delta_{U_\beta}$ are the two current sampling time compensation control components in the $\alpha\beta$ coordinate system, respectively; and
where $i_a$, $i_b$, and $i_c$ are the current sampling time three-phase currents; $T_d$ is the current sampling time compensation PWM duty ratio; and $T_{pwm1}$ is the current sampling time pre-compensation PWM duty ratio corresponding to the current sampling time compensation voltage vector;

sign($i_a$) is used for characterizing a polarity of $i_a$, $i_a$>0 and sign($i_a$)>0 in response to the polarity of $i_a$ being positive, and $i_a$<0 and sign($i_a$)<0 in response to the polarity of $i_a$ being negative;

sign($i_b$) is used for characterizing a polarity of $i_b$, $i_b$>0 and sign($i_b$)>0 in response to the polarity of $i_b$ being positive, and $i_b$<0 and sign($i_b$)<0 in response to the polarity of $i_b$ being negative; and sign($i_c$) is used for characterizing a polarity of $i_c$, $i_c$>0 and sign($i_c$)>0 in response to the polarity of $i_c$, being positive, and $i_c$<0 and sign($i_c$)<0 in response to the polarity of $i_c$ being negative.

In a second aspect, there is provided a dead-time compensation apparatus for a PMSM, including:

a detection unit, configured to acquire current sampling time d-axis currents and current sampling time q-axis currents corresponding to current sampling time three-phase stator currents of the PMSM, where the d-axis and the q-axis are coordinate axes in a dq coordinate system, the current sampling time d-axis currents are components of the current sampling time three-phase stator currents in the d-axis, and the current sampling time q-axis currents are components of the current sampling time three-phase stator currents in the q-axis;

a filtering unit, configured to perform low-pass filtering on the current sampling time d-axis currents and the current sampling time q-axis currents to obtain current sampling time filtered d-axis currents and current sampling time filtered q-axis currents;

an angle acquisition unit, configured to acquire, according to vector angles of current sampling time three-phase current vectors, the current sampling time filtered d-axis currents, and the current sampling time filtered q-axis currents, included angles between the current sampling time three-phase current vectors and the d-axis;

the angle acquisition unit being further configured to acquire current sampling time angles θ of the current sampling time three-phase current vectors in an αβ coordinate system according to the included angles between the current sampling time three-phase current vectors and the d-axis;

a polarity acquisition unit, configured to acquire polarities of the current sampling time three-phase stator currents according to the current sampling time angles θ; and a compensation unit, configured to acquire current sampling time compensation voltage values according to current sampling time pre-compensation voltage values, current sampling time pre-compensation PWM duty ratios, a current sampling time compensation PWM duty ratio, and the polarities of the current sampling time three-phase stator currents.

In a third aspect, there is provided a computer device including a memory, a processor, and computer programs stored on the memory and executable on the processor; the processor, when executing the computer programs, implements the method according to any one of the above.

In a fourth aspect, there is provided a computer-readable storage medium storing thereon computer programs that, when executed by a processor, implement the method according to any one of the above.

The present disclosure provides a dead-time compensation method and apparatus for a PMSM, a device, and a storage medium. In the method, the current sampling time three-phase stator currents are detected, and the polarities of the current sampling time three-phase stator currents are acquired, further acquiring the current sampling time compensation voltage values; the impact of the dead-time effect on the control precision of the PMSM is eliminated or reduced, thereby enhancing the operational stability and control accuracy of the PMSM. In addition, the method in the embodiments of the present disclosure features low computational complexity, simple operation, minimal system overhead, and is suitable for applications with lower computational requirements. Due to its low computational complexity and simple data acquisition, current sampling time compensation voltage values can be derived according to the current sampling time data, enabling dead-time compensation with minimal compensation delay and achieving superior compensation effects.

BRIEF DESCRIPTION OF DRAWINGS

The drawings, which are incorporated in and constitute a part of the specification, illustrate embodiments consistent with the present disclosure and, together with the specification, serve to explain the principles of the present disclosure.

To explain the technical solutions in the embodiments of the present disclosure or in the prior art more clearly, the following simple description will be given to the drawings used in the embodiments or the description of the prior art. The ordinarily skilled in the art may obtain other drawings according to these drawings without involving any inventive effort.

DETAILED DESCRIPTION OF THE EMBODIMENTS

To make the objects, technical solutions, and advantages of the embodiments of the present disclosure become more apparent, the technical solutions in the embodiments of the present disclosure will be clearly and completely described in combination with the drawings of the embodiments of the present disclosure. The embodiments described are part of but not all embodiments of the present disclosure. Based on the embodiments in the present disclosure, all the other embodiments obtained by the ordinarily skilled in the art without involving any inventive effort fall within the scope of protection of the present disclosure.

Figure 1:
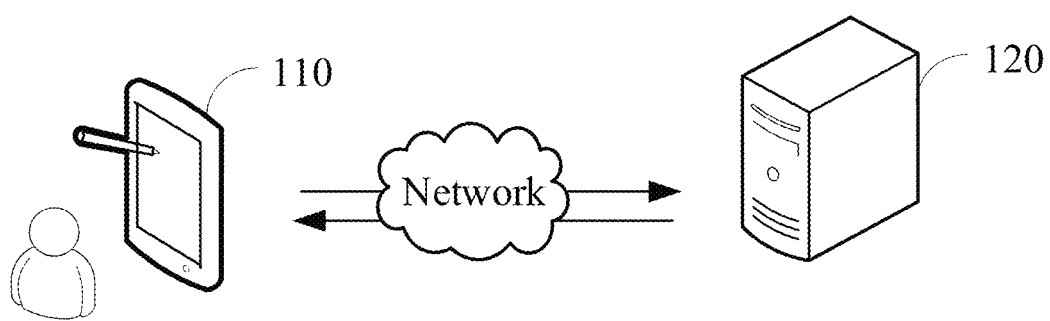
FIG. 1 is an application environment diagram of a dead-time compensation method for a PMSM according to an embodiment of the present disclosure.

FIG. 1 is an application environment diagram of a dead-time compensation method for a PMSM in one embodiment. Referring to FIG. 1, the dead-time compensation method for a PMSM is applied to a dead-time compensation system for a PMSM. The dead-time compensation method for a PMSM includes a terminal 110 and/or a server 120. The terminal 110 and the server 120 are connected through a network. The terminal 110 may specifically be a desktop terminal or a mobile terminal, and the mobile terminal may specifically be at least one of a mobile phone, a tablet computer, a notebook computer, and the like. The server 120 may be implemented as a stand-alone server or as a server cluster of a plurality of servers.

The dead-time compensation method for a PMSM of the present disclosure is applied to the terminal 110 and/or the server 120.

Figure 2:
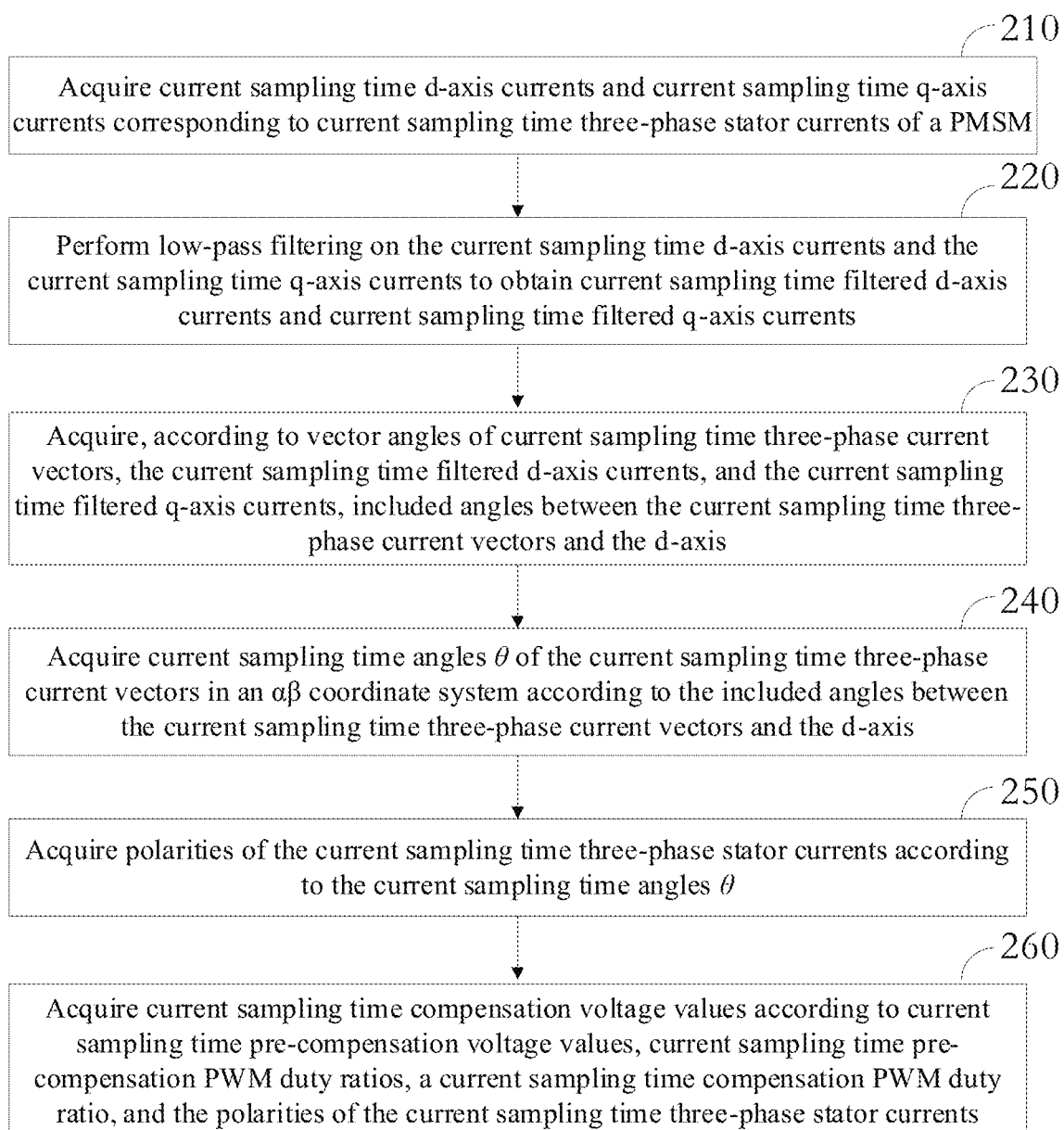
FIG. 2 is a flow diagram of a dead-time compensation method for a PMSM according to an embodiment of the present disclosure.

As shown in FIG. 2, there is provided a dead-time compensation method for a PMSM in one embodiment. The embodiment is mainly exemplified with the method applied to the server 120 in FIG. 1 described above. Referring to FIG. 2, the dead-time compensation method for a PMSM includes:

Step 210: Acquire current sampling time d-axis currents and current sampling time q-axis currents corresponding to current sampling time three-phase stator currents of the PMSM.

The d-axis and the q-axis are coordinate axes in a dq coordinate system, the current sampling time d-axis currents are components of the current sampling time three-phase stator currents in the d-axis, and the current sampling time q-axis currents are components of the current sampling time three-phase stator currents in the q-axis.

The PMSM includes three-phase stator currents, and the three-phase stator currents may be denoted as $i_A$, $i_B$, and $i_C$, respectively; the current sampling time stator currents are denoted as $i_a$, $i_b$, and $i_c$.

It should be noted that $i_A$, $i_B$, and $i_C$ are general terms for the three-phase stator currents, while $i_a$, $i_b$, and $i_c$ are the current sampling time stator currents.

The three-phase stator currents pass through the zero point sequentially. In embodiments of the present disclosure, the duration between the two adjacent stator currents passing through the zero point is referred to as a cycle, for example, the time of $i_A$ passing through the zero point to the time of $i_B$ passing through the zero point, or the time of $i_C$ passing through the zero point to the next time of $i_A$ passing through the zero point. The polarities of the three-phase stator currents around the zero point are different.

In an embodiment of the present disclosure, the d-axis current $i_d$ and the q-axis current $i_q$ may be obtained by Clark transformation and Park transformation.

The Clark transformation and the Park transformation are mathematical transformations used in motor control that transform variables of a three-phase AC system into two orthogonal coordinate systems to simplify analysis and control.

The Clark transformation, also known as the Clarke transformation, transforms the variables of the three-phase AC system into a two-phase stationary αβ coordinate system. This transformation is based on the symmetry of a three-phase system, which can simplify the variables of the three-phase system into two variables, thus simplifying the design and analysis of the control system.

The Park transformation further transforms the variables in the αβ coordinate system into a rotated dq coordinate system. In the dq coordinate system, the d-axis coincides with the rotor flux direction, and the q-axis is perpendicular to the rotor flux direction.

Both the αβ coordinate system and the dq coordinate system are one of Cartesian coordinate systems.

In the embodiment of the present disclosure, the three-phase stator currents may be directly detected by a current meter or the like, or calculated based on the detected voltage, which will not be described in detail herein.

Step 220: Perform low-pass filtering on the current sampling time d-axis currents and the current sampling time q-axis currents to obtain current sampling time filtered d-axis currents and current sampling time filtered q-axis currents.

Step 230: Acquire, according to vector angles of current sampling time three-phase current vectors, the current sampling time filtered d-axis currents, and the current sampling time filtered q-axis currents, included angles between the current sampling time three-phase current vectors and the d-axis.

Step 240: Acquire current sampling time angles θ of the current sampling time three-phase current vectors in an αβ coordinate system according to the included angles between the current sampling time three-phase current vectors and the d-axis.

Step 250: Acquire polarities of the current sampling time three-phase stator currents according to the current sampling time angles θ.

Step 260: Acquire current sampling time compensation voltage values according to current sampling time pre-compensation voltage values, current sampling time pre-compensation PWM duty ratios, a current sampling time compensation PWM duty ratio, and the polarities of the current sampling time three-phase stator currents.

In an embodiment of the present disclosure, a plurality of sampling times are set within a single cycle; based on various parameters of the current sampling time, the current sampling time compensation voltage values are acquired and used to compensate for the current sampling time.

In an embodiment of the present disclosure, dead-time compensation is performed at the current sampling time after the collected data of the current sampling time is calculated, and the period during which the current sampling time compensation voltage value takes effect is from the current sampling time to the next sampling time. Due to the small amount of data collected by the present disclosure, the calculation is simple and the calculation speed is fast, so the calculation can be performed with the collected data at the current sampling moment to perform dead-time compensation at the current sampling time.

In the embodiment of the present disclosure, the current sampling time three-phase stator currents are detected, and the polarities of the current sampling time three-phase stator currents are acquired, further acquiring the current sampling time compensation voltage values; the impact of the dead-time effect on the control precision of the PMSM is eliminated or reduced, thereby enhancing the operational stability and control accuracy of the PMSM. In addition, the method in the embodiments of the present disclosure features low computational complexity, simple operation, minimal system overhead, and is suitable for applications with lower computational requirements. Due to its low computational complexity and straightforward data acquisition, current sampling time compensation voltage values may be derived according to the current sampling time data, enabling dead-time compensation with minimal compensation delay and achieving superior compensation effects.

In an embodiment of the present disclosure, in step 220, the performing low-pass filtering on the current sampling time d-axis currents and the current sampling time q-axis currents to obtain current sampling time filtered d-axis currents and current sampling time filtered q-axis currents includes:

acquiring d-axis filtering coefficients of d-axis low-pass filters;

acquiring last sampling time filtered d-axis currents output by the d-axis low-pass filters;

obtaining the current sampling time filtered d-axis currents output by the d-axis low-pass filters according to the last sampling time filtered d-axis currents, the current sampling time d-axis currents, and the d-axis filtering coefficients;

acquiring q-axis filtering coefficients of q-axis low-pass filters;

acquiring last sampling time filtered q-axis currents output by the q-axis low-pass filters; and obtaining the current sampling time filtered q-axis currents output by the q-axis low-pass filters according to the last sampling time filtered q-axis currents, the current sampling time q-axis currents, and the q-axis filtering coefficients.

In an embodiment of the present disclosure, the current sampling time d-axis current and the current sampling time q-axis current are the currents entering the d-axis low-pass filter and the q-axis low-pass filter, respectively, that is, the currents of the d-axis low-pass filter and the q-axis low-pass filter are the currents before filtering. In an embodiment of the present disclosure, the obtaining the current sampling time filtered d-axis currents output by the d-axis low-pass filters according to the last sampling time filtered d-axis currents, the current sampling time d-axis currents, and the d-axis filtering coefficients includes:

calculating the current sampling time filtered d-axis currents according to a first equation, the first equation being:

$Yd(n)=ad*Xd(n)+(1-ad)*Yd(n-1)$, where Yd(n) is the current sampling time filtered d-axis current; Xd(n) is the current sampling time d-axis current; Yd(n−1) is the last sampling time filtered d-axis current; and ad is the d-axis filtering coefficient; and calculating the current sampling time filtered q-axis currents according to a second equation, the second equation being:

$Yq(n)=aq*Xq(n)+(1-aq)*Yq(n-1)$, where Yq(n) is the current sampling time filtered q-axis current; Xq(n) is the current sampling time q-axis current; Yq(n−1) is the last sampling time filtered q-axis current; and aq is the q-axis filtering coefficient.

In an embodiment of the present disclosure, the q-axis currents and the d-axis currents are subjected to low-pass filtering to reduce the interference, reduce the output oscillation, and improve the accuracy of the dead-time compensation.

In an embodiment of the present disclosure, before step 230, namely, before the acquiring, according to vector angles of current sampling time three-phase current vectors, the current sampling time filtered d-axis currents, and the current sampling time filtered q-axis currents, included angles between the current sampling time three-phase current vectors and the d-axis, the method further includes:

acquiring the current sampling time three-phase current vectors, where vector values of the current sampling time three-phase current vectors are values of the current sampling time three-phase stator currents, and the vector angles of the current sampling time three-phase current vectors are current sampling time rotor angles of the PMSM.

In an embodiment of the present disclosure, step 230 of acquiring, according to vector angles of current sampling time three-phase current vectors, the current sampling time filtered d-axis currents, and the current sampling time filtered q-axis currents, included angles between the current sampling time three-phase current vectors and the d-axis includes:

calculating the included angles between the current sampling time three-phase current vectors and the d-axis according to a third equation, the third equation being:

$\psi=\arctan(i_d/i_q)$, where $\psi$ is the included angle between the current sampling time three-phase current vector and the d-axis; $i_d$ is the current sampling time filtered d-axis current; and $i_q$ is the current sampling time filtered q-axis current.

In an embodiment of the present disclosure, step 240 of acquiring current sampling time angles θ of the current sampling time three-phase current vectors in an αβ coordinate system according to the included angles between the current sampling time three-phase current vectors and the d-axis includes:

calculating the current sampling time angles θ of the current sampling time three-phase current vectors in the αβ coordinate system according to a fourth equation, the fourth equation being:

$\theta=\psi+\omega$, where $\psi$ is the included angle between the current sampling time three-phase current vector and the d-axis; and ω is a current sampling time rotor angle of the PMSM.

The current sampling time rotor angles of the PMSM may be obtained through a magnetic encoder arranged on the rotor of the PMSM, and may also be obtained through other detectors or detection modes, which will not be described in detail herein.

Figure 3:
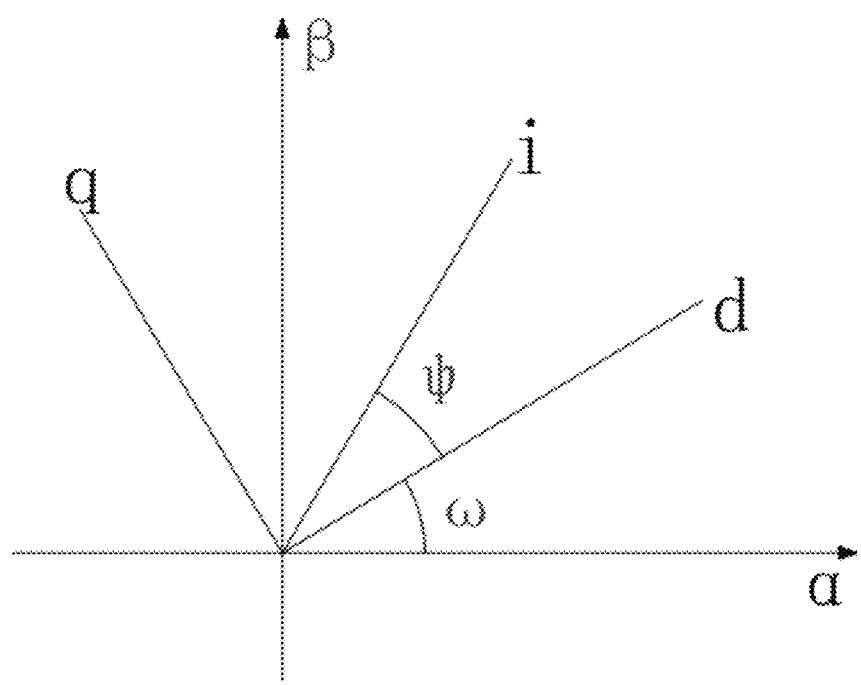
FIG. 3 is a diagram of a current vector according to an embodiment of the present disclosure.

In an embodiment of the present disclosure, the current sampling time three-phase current vectors are shown in FIG. 3.

In an embodiment of the present disclosure, step 250 of the acquiring polarities of the current sampling time three-phase stator currents according to the current sampling time angles θ includes:

acquiring angle and polarity correspondence; and acquiring the polarities of the current sampling time three-phase stator currents according to the current sampling time angles θ and the angle and polarity correspondence, the angle and polarity correspondence being:

in response to $$\frac{\pi}{6} \le \theta < \frac{\pi}{2},$$

the polarities of the current sampling time three-phase stator currents are positive, positive, and negative, respectively;

in response to $$\frac{\pi}{2} \le \theta < \frac{5\pi}{6},$$

the polarities of the current sampling time three-phase stator currents are negative, positive, and negative, respectively;

in response to $$\frac{5\pi}{6} \le \theta < \frac{7\pi}{6},$$

the polarities of the current sampling time three-phase stator currents are negative, positive, and positive, respectively;

in response to $$\frac{7\pi}{6} \le \theta < \frac{3\pi}{2},$$

the polarities of the current sampling time three-phase stator currents are negative, negative, and positive, respectively;

in response to $$\frac{3\pi}{2} \le \theta < \frac{11\pi}{6},$$

the polarities of the current sampling time three-phase stator currents are positive, negative, and positive, respectively;

in response to $$\frac{11\pi}{6} \le \theta < 2\pi,$$

the polarities of the current sampling time three-phase stator currents are positive, negative, and negative, respectively; and in response to $$0 \le \theta < \frac{\pi}{6},$$

the polarities or the current sampling time three-phase stator currents are positive, negative, and negative, respectively.

In the embodiment of the present disclosure, after calculation of θ, the polarities of the three-phase stator currents may be obtained according to the above angle and polarity correspondence. The current sampling time three-phase current include $i_a$, $i_b$, and $i_c$; in response to θ being 0, $i_a$ is positive, $i_b$ is negative, and $i_c$ is negative.

In an embodiment of the present disclosure, at step 250, the current sampling time three-phase currents include $i_a$, $i_b$, and $i_c$; and the current sampling time compensation voltage values include $\Delta_{ua}$ corresponding to $i_a$, $\Delta_{ub}$ corresponding to $i_b$, and $\Delta_{uc}$ corresponding to $i_c$; and the acquiring current sampling time compensation voltage values according to current sampling time pre-compensation voltage values, current sampling time pre-compensation PWM duty ratios, a current sampling time compensation PWM duty ratio, and the polarities of the current sampling time three-phase stator currents includes:

calculating the current sampling time compensation voltage values according to a fifth equation, the fifth equation being:

$$\Delta_{ua} = U_{dca} * \frac{T_d}{T_{pwma}} * \mathrm{sign}(i_a),$$

$$\Delta_{ub} = U_{dcb} * \frac{T_d}{T_{pwmb}} * \mathrm{sign}(i_b),$$

$$\Delta_{uc} = U_{dcc} * \frac{T_d}{T_{pwmc}} * \mathrm{sign}(i_c),$$

where $U_{dca}$ is the current sampling time pre-compensation voltage value corresponding to $i_a$; $T_{pwma}$ is the current sampling time pre-compensation PWM duty ratio corresponding to $i_a$; $T_d$ is the current sampling time compensation PWM duty ratio; and $\mathrm{sign}(i_a)$ is used for characterizing a polarity of $i_a$, $i_a>0$ and $\mathrm{sign}(i_a)>0$ in response to the polarity of $i_a$ being positive, and $i_a<0$ and $\mathrm{sign}(i_a)<0$ in response to the polarity of $i_a$ being negative;

$U_{dcb}$ is the current sampling time pre-compensation voltage value corresponding to $i_b$; $T_{pwmb}$ is the current sampling time pre-compensation PWM duty ratio corresponding to $i_b$; and $\mathrm{sign}(i_b)$ is used for characterizing a polarity of $i_b$, $i_b>0$ and $\mathrm{sign}(i_b)>0$ in response to the polarity of $i_b$ being positive, and $i_b<0$ and $\mathrm{sign}(i_b)<0$ in response to the polarity of $i_b$ being negative; and $U_{dcc}$ is the current sampling time pre-compensation voltage value corresponding to $i_c$; $T_{pwmc}$ is the current sampling time pre-compensation PWM duty ratio corresponding to $i_c$; and $\mathrm{sign}(i_c)$ is used for characterizing a polarity of $i_c$, $i_c>0$ and $\mathrm{sign}(i_c)>0$ in response to the polarity of $i_c$ being positive, and $i_c<0$ and $\mathrm{sign}(i_c)<0$ in response to the polarity of $i_c$ being negative.

In the embodiment of the present disclosure, $U_{dca}$, $U_{dcb}$, and $U_{dcc}$ are voltages in an ideal state without a dead-time; $T_{pwma}$, $T_{pwmb}$, and $T_{pwmc}$ are duty ratios in an ideal state; Ta may be acquired according to the parameters of the power transistor itself in the inverter.

In an embodiment of the present disclosure, when the polarities of the stator currents are positive, the compensation voltage values are positive, which is equivalent to increasing the output of the original voltages; when the polarities of the stator currents are negative, the compensation voltage values are negative, which is equivalent to reducing the output of the original voltages.

In an embodiment of the present disclosure, in response to θ=0, $i_a$ is positive, $i_b$ is negative, and $i_c$ is negative; the calculated $\Delta_{ua}$ is positive, $\Delta_{ub}$ is negative, and $\Delta_{uc}$ is negative, then compensation is performed through $\Delta_{ua}$, $\Delta_{ub}$, $\Delta_{uc}$.

In an embodiment of the present disclosure, the three-phase stator current is detected, and the polarities of the current sampling time three-phase stator currents are acquired, thereby acquiring compensation voltage values. Since the stator current has polarity, if the compensation voltage calculated without considering the polarity of the stator current may increase the difference between the compensated voltage and the required voltage, but may increase the dead-time effect, the polarities of the three-phase electronic currents are considered in the present disclosure, so that the acquired compensation voltage can increase or decrease the output of the original voltage, so that the compensated voltage and the required voltage are closer to each other. The impact of the dead-time effect on the control precision of the PMSM is eliminated or reduced, thereby enhancing the operational stability and control accuracy of the PMSM. In addition, the method in the embodiments of the present disclosure features low computational complexity, simple operation, minimal system overhead, and is suitable for applications with lower computational requirements. Due to low computational complexity and simple data to be collected, the calculation speed is fast; a compensation voltage may be quickly obtained after the data is collected at the current sampling time to perform dead-time compensation on the current sampling time, enabling dead-time compensation with minimal compensation delay and achieving superior compensation effects.

In the embodiment of the present disclosure, the above compensation voltage value is transmitted to the inverter, and the PMSM is controlled by the output of the inverter.

In an embodiment of the present disclosure, the control of the PMSM by the inverter at the same time is performed by the PWM; specifically, the control is performed by two compensation control components in the $\alpha\beta$ coordinate system; therefore, in the embodiment of the present disclosure, a method for acquiring the two compensation control components of the inverter is also disclosed.

Figure 4:
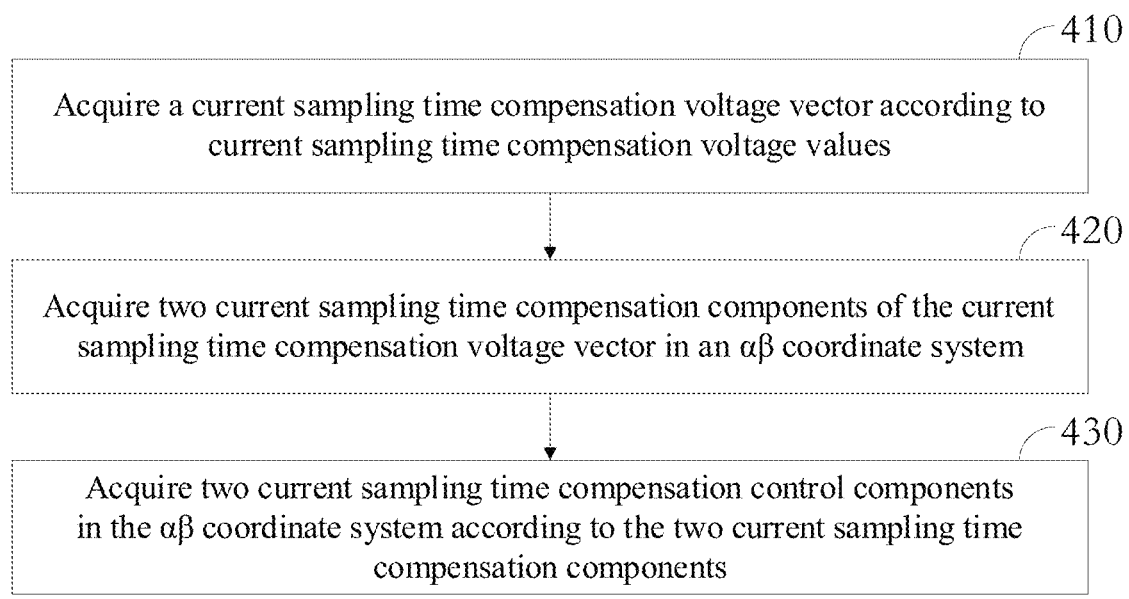
FIG. 4 is a flow diagram of a dead-time compensation method for a PMSM according to an embodiment of the present disclosure.

As shown in FIG. 4, in an embodiment of the present disclosure, after step 250, and after the acquiring current sampling time compensation voltage values, the method further includes:

Step 410: Acquire a current sampling time compensation voltage vector according to the current sampling time compensation voltage values.

Step 420: Acquire two current sampling time compensation components of the current sampling time compensation voltage vector in the $\alpha\beta$ coordinate system.

Step 430: Acquire two current sampling time compensation control components in the $\alpha\beta$ coordinate system according to the two current sampling time compensation components.

The acquiring a current sampling time compensation voltage vector according to the current sampling time compensation voltage values includes:

acquiring the current sampling time compensation voltage vector according to a sixth equation, the sixth equation being:

$$U = \frac{2}{3}\left[\text{sign}(i_a) + e^{j\frac{2}{3}r}\text{sign}(i_b) + e^{j\frac{4}{3}r}\text{sign}(i_c)\right],$$

where U is the current sampling time compensation voltage vector;

the acquiring two current sampling time compensation components of the current sampling time compensation voltage vector in the $\alpha\beta$ coordinate system includes:

acquiring the two current sampling time compensation components of the current sampling time compensation voltage vector in the $\alpha\beta$ coordinate system according to a seventh equation, the seventh equation being:

$$U_{\alpha p} = \frac{2}{3}\left[\text{sign}(i_a) - \frac{1}{2}\text{sign}(i_b) - \frac{1}{2}\text{sign}(i_c)\right],$$

$$U_{\beta p} = \frac{2}{3}\left[\frac{\sqrt{3}}{2}\text{sign}(i_b) - \frac{\sqrt{3}}{2}\text{sign}(i_c)\right],$$

where $U_{\alpha_p}$ and $U_{\beta_p}$ are the two current sampling time compensation components of the current sampling time compensation voltage vector in the $\alpha\beta$ coordinate system, respectively; and the acquiring two current sampling time compensation control components in the $\alpha\beta$ coordinate system according to the two current sampling time compensation components includes:

acquiring the two current sampling time compensation control components in the $\alpha\beta$ coordinate system according to an eighth equation, the eighth equation being:

$$\Delta_{U_\alpha} = U_{dc} * \frac{2T_d}{T_{pwm1}} * U_{\alpha p},$$

$$\Delta_{U_\beta} = U_{dc} * \frac{2T_d}{T_{pwm1}} * U_{\beta p},$$

where $\Delta_{U_\alpha}$ and $\Delta_{U_\beta}$ are the two current sampling time compensation control components in the $\alpha\beta$ coordinate system, respectively; and where $i_a$, $i_b$, and $i_c$ are the current sampling time three-phase currents; $T_d$ is the current sampling time compensation PWM duty ratio; and $T_{pwm1}$ is the current sampling time pre-compensation PWM duty ratio corresponding to the current sampling time compensation voltage vector;

sign($i_a$) is used for characterizing a polarity of $i_a$, $i_a>0$ and sign($i_a$)>0 in response to the polarity of $i_a$ being positive, and $i_a<0$ and sign($i_a$)<0 in response to the polarity of $i_a$ being negative;

sign($i_b$) is used for characterizing a polarity of $i_b$, $i_b>0$ and sign($i_b$)>0 in response to the polarity of $i_b$ being positive, and $i_b<0$ and sign($i_b$)<0 in response to the polarity of $i_b$ being negative; and sign($i_c$) is used for characterizing a polarity of $i_c$, $i_c>0$ and sign($i_c$)>0 in response to the polarity of $i_c$ being positive, and $i_c<0$ and sign($i_c$)<0 in response to the polarity of $i_c$ being negative.

$T_d$ may be acquired according to the parameters of the power transistor itself in the inverter.

In an embodiment of the present disclosure, the three-phase stator current is detected, and the polarities of the current sampling time three-phase stator currents are acquired, thereby acquiring compensation voltage values. Since the stator current has polarity, if the compensation voltage calculated without considering the polarity of the stator current may increase the difference between the compensated voltage and the required voltage, but may increase the dead-time effect, the polarities of the three-phase electronic currents are considered in the present disclosure, so that the acquired compensation voltage can increase or decrease the output of the original voltage, so that the compensated voltage and the required voltage are closer to each other. The impact of the dead-time effect on the control precision of the PMSM is eliminated or reduced, thereby enhancing the operational stability and control accuracy of the PMSM. In addition, the method in the embodiments of the present disclosure features low computational complexity, simple operation, minimal system overhead, and is suitable for applications with lower computational requirements. Due to low computational complexity and simple data to be collected, the calculation speed is fast; a compensation voltage may be quickly obtained after the data is collected at the current sampling time to perform dead-time compensation on the current sampling time, enabling dead-time compensation with minimal compensation delay and achieving superior compensation effects.

Figure 5:
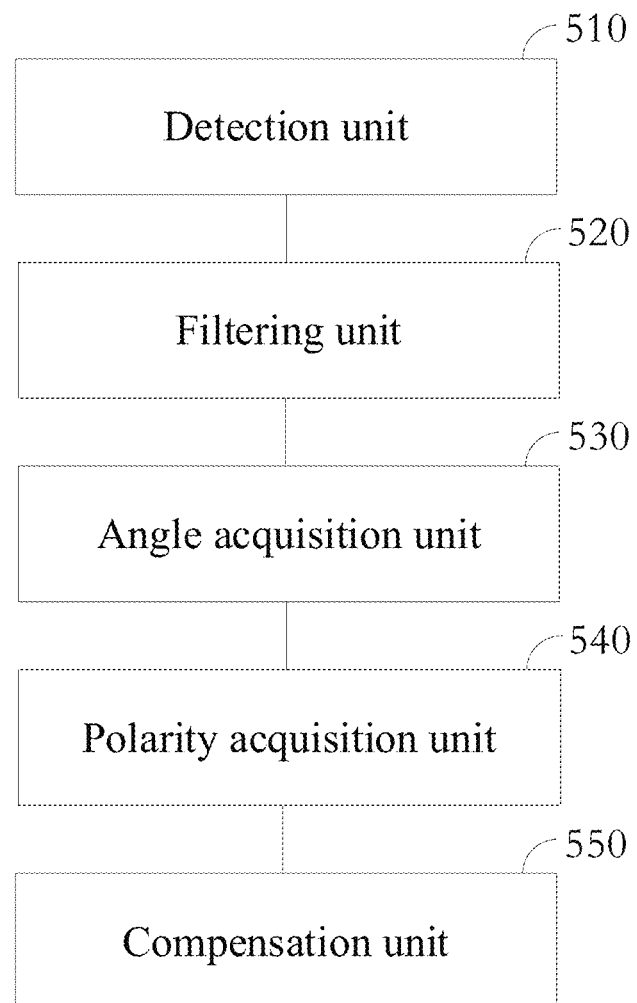
FIG. 5 is a structural block diagram of a dead-time compensation apparatus for a PMSM according to an embodiment of the present disclosure.

As shown in FIG. 5, the present disclosure further provides a dead-time compensation apparatus for a PMSM, including:

- a detection unit 510, configured to acquire current sampling time d-axis currents and current sampling time q-axis currents corresponding to current sampling time three-phase stator currents of the PMSM, where the d-axis and the q-axis are coordinate axes in a dq coordinate system, the current sampling time d-axis currents are components of the current sampling time three-phase stator currents in the d-axis, and the current sampling time q-axis currents are components of the current sampling time three-phase stator currents in the q-axis;
- a filtering unit 520, configured to perform low-pass filtering on the current sampling time d-axis currents and the current sampling time q-axis currents to obtain current sampling time filtered d-axis currents and current sampling time filtered q-axis currents;
- an angle acquisition unit 530, configured to acquire, according to vector angles of current sampling time three-phase current vectors, the current sampling time filtered d-axis currents, and the current sampling time filtered q-axis currents, included angles between the current sampling time three-phase current vectors and the d-axis;
- the angle acquisition unit 530 being further configured to acquire current sampling time angles θ of the current sampling time three-phase current vectors in an αβ coordinate system according to the included angles between the current sampling time three-phase current vectors and the d-axis;
- a polarity acquisition unit 540, configured to acquire polarities of the current sampling time three-phase stator currents according to the current sampling time angles θ; and
- a compensation unit 550, configured to acquire current sampling time compensation voltage values according to current sampling time pre-compensation voltage values, current sampling time pre-compensation PWM duty ratios, a current sampling time compensation PWM duty ratio, and the polarities of the current sampling time three-phase stator currents.

In an embodiment of the present disclosure, the filtering unit 520 is further configured to:
- acquire d-axis filtering coefficients of d-axis low-pass filters;
- acquire last sampling time filtered d-axis currents output by the d-axis low-pass filters;
- obtain the current sampling time filtered d-axis currents output by the d-axis low-pass filters according to the last sampling time filtered d-axis currents, the current sampling time d-axis currents, and the d-axis filtering coefficients;
- acquire q-axis filtering coefficients of q-axis low-pass filters;
- acquire last sampling time filtered q-axis currents output by the q-axis low-pass filters; and
- obtain the current sampling time filtered q-axis currents output by the q-axis low-pass filters according to the last sampling time filtered q-axis currents, the current sampling time q-axis currents, and the q-axis filtering coefficients.

In an embodiment of the present disclosure, the filtering unit 520 is further configured to:
- calculate the current sampling time filtered d-axis currents according to a first equation, the first equation being:

$Yd(n)=ad*Xd(n)+(1-ad)*Yd(n-1)$, where Yd(n) is the current sampling time filtered d-axis current; Xd(n) is the current sampling time d-axis current; Yd(n−1) is the last sampling time filtered d-axis current; and ad is the d-axis filtering coefficient; and
- calculate the current sampling time filtered q-axis currents according to a second equation, the second equation being:

$Yq(n)=aq*Xq(n)+(1-aq)*Yq(n-1)$, where Yq(n) is the current sampling time filtered q-axis current; Xq(n) is the current sampling time q-axis current; Yq(n−1) is the last sampling time filtered q-axis current; and aq is the q-axis filtering coefficient.

In an embodiment of the present disclosure, the angle acquisition unit 530 is further configured to:
- acquire the current sampling time three-phase current vector,
- where vector values of the current sampling time three-phase current vectors are values of the current sampling time three-phase stator currents, and the vector angles of the current sampling time three-phase current vectors are current sampling time rotor angles of the PMSM.

In an embodiment of the present disclosure, the angle acquisition unit 530 is further configured to:
- calculate the included angles between the current sampling time three-phase current vectors and the d-axis according to a third equation, the third equation being:

$\psi=\arctan(i_d/i_q)$, where $\psi$ is the included angle between the current sampling time three-phase current vector and the d-axis; $i_d$ is the current sampling time filtered d-axis current; and $i_q$ is the current sampling time filtered q-axis current.

In an embodiment of the present disclosure, the angle acquisition unit 530 is further configured to:
- calculate the current sampling time angles θ of the current sampling time three-phase current vectors in the αβ coordinate system according to a fourth equation, the fourth equation being:

$\theta=\psi+\omega$, where $\psi$ is the included angle between the current sampling time three-phase current vector and the d-axis; and ω is a current sampling time rotor angle of the PMSM.

In an embodiment of the present disclosure, the polarity acquisition unit 540 is further configured to:
- acquire angle and polarity correspondence; and
- acquire the polarities of the current sampling time three-phase stator currents according to the current sampling time angles θ and the angle and polarity correspondence, the angle and polarity correspondence being:
in response to $$\frac{\pi}{6} \leq \theta < \frac{\pi}{2},$$

the polarities or the current sampling time three-phase stator currents are positive, positive, and negative, respectively;

in response to $$\frac{\pi}{2} \leq \theta < \frac{5\pi}{6},$$

the polarities of the current sampling time three-phase stator currents are negative, positive, and negative, respectively;

in response to $$\frac{5\pi}{6} \leq \theta < \frac{7\pi}{6},$$

the polarities of the current sampling time three-phase stator currents are negative, positive, and positive, respectively;

in response to $$\frac{7\pi}{6} \leq \theta < \frac{3\pi}{2},$$

the polarities of the current sampling time three-phase stator currents are negative, negative, and positive, respectively;

in response to $$\frac{3\pi}{2} \leq \theta < \frac{11\pi}{6},$$

the polarities of the current sampling time three-phase stator currents are positive, negative, and positive, respectively;

in response to $$\frac{11\pi}{6} \leq \theta < 2\pi,$$

the polarities of the current sampling time three-phase stator currents are positive, negative, and negative, respectively; and in response to $$0 \leq \theta < \frac{\pi}{6},$$

the polarities or the current sampling time three-phase stator currents are positive, negative, and negative, respectively.

In an embodiment of the present disclosure, the current sampling time three-phase currents include $i_a$, $i_b$, and $i_c$; and the current sampling time compensation voltage values include $\Delta_{ua}$ corresponding to $i_a$, $\Delta_{ub}$ corresponding to $i_b$, and $\Delta_{uc}$ corresponding to $i_c$.

The compensation unit 550 is further configured to:
calculate the current sampling time compensation voltage values according to a fifth equation, the fifth equation being:

$$\Delta_{ua} = U_{dca} * \frac{T_d}{T_{pwma}} * \text{sign}(i_a),$$

$$\Delta_{ub} = U_{dcb} * \frac{T_d}{T_{pwmb}} * \text{sign}(i_b),$$

$$\Delta_{uc} = U_{dcc} * \frac{T_d}{T_{pwmc}} * \text{sign}(i_c),$$

where $U_{dca}$ is the current sampling time pre-compensation voltage value corresponding to $i_a$; $T_{pwma}$ is the current sampling time pre-compensation PWM duty ratio corresponding to $i_a$; $T_d$ is the current sampling time compensation PWM duty ratio; and $\text{sign}(i_a)$ is used for characterizing a polarity of $i_a$, $i_a > 0$ and $\text{sign}(i_a) > 0$ in response to the polarity of $i_a$ being positive, and $i_a < 0$ and $\text{sign}(i_a) < 0$ in response to the polarity of $i_a$ being negative;

$U_{dcb}$ is the current sampling time pre-compensation voltage value corresponding to $i_b$; $T_{pwmb}$ is the current sampling time pre-compensation PWM duty ratio corresponding to $i_b$; and $\text{sign}(i_b)$ is used for characterizing a polarity of $i_b$, $i_b > 0$ and $\text{sign}(i_b) > 0$ in response to the polarity of $i_b$ being positive, and $i_b < 0$ and $\text{sign}(i_b) < 0$ in response to the polarity of $i_b$ being negative; and $U_{dcc}$ is the current sampling time pre-compensation voltage value corresponding to $i_c$; $T_{pwmc}$ is the current sampling time pre-compensation PWM duty ratio corresponding to $i_c$; and $\text{sign}(i_c)$ is used for characterizing a polarity of $i_c$, $i_c > 0$ and $\text{sign}(i_c) > 0$ in response to the polarity of $i_c$ being positive, and $i_c < 0$ and $\text{sign}(i_c) < 0$ in response to the polarity of $i_c$ being negative.

In an embodiment of the present disclosure, after the acquiring current sampling time compensation voltage values, the compensation unit 550 is further configured to:
acquire a current sampling time compensation voltage vector according to the current sampling time compensation voltage values;
acquire two current sampling time compensation components of the current sampling time compensation voltage vector in the αβ coordinate system; and
acquire two current sampling time compensation control components in the αβ coordinate system according to the two current sampling time compensation components.

In an embodiment of the present disclosure, the compensation unit 550 is further configured to:
acquire the current sampling time compensation voltage vector according to a sixth equation, the sixth equation being:

$$U = \frac{2}{3}\left[\text{sign}(i_a) + e^{j\frac{2}{3}\pi}\text{sign}(i_b) + e^{j\frac{4}{3}\pi}\text{sign}(i_c)\right],$$

where U is the current sampling time compensation voltage vector;
the acquiring two current sampling time compensation components of the current sampling time compensation voltage vector in the αβ coordinate system includes:
acquiring the two current sampling time compensation components of the current sampling time compensation voltage vector in the αβ coordinate system according to a seventh equation, the seventh equation being:

$$U_{\alpha p} = \frac{2}{3}\left[\text{sign}(i_a) - \frac{1}{2}\text{sign}(i_b) - \frac{1}{2}\text{sign}(i_c)\right],$$

$$U_{\beta p} = \frac{2}{3}\left[\frac{\sqrt{3}}{2}\text{sign}(i_b) - \frac{\sqrt{3}}{2}\text{sign}(i_c)\right],$$

where $U_{\alpha p}$ and $U^{\beta p}$ are the two current sampling time compensation components of the current sampling time compensation voltage vector in the αβ coordinate system, respectively; and the acquiring two current sampling time compensation control components in the αβ coordinate system according to the two current sampling time compensation components includes:

acquiring the two current sampling time compensation control components in the αβ coordinate system according to an eighth equation, the eighth equation being:

$$\Delta_{U_\alpha} = U_{dc} * \frac{2T_d}{T_{pwm1}} * U_{\alpha p},$$

$$\Delta_{U_\beta} = U_{dc} * \frac{2T_d}{T_{pwm1}} * U_{\beta p},$$

where $\Delta_{U_\alpha}$ and $\Delta_{U_\beta}$ are the two current sampling time compensation control components in the αβ coordinate system, respectively; and where $i_a$, $i_b$, and $i_c$ are the current sampling time three-phase currents; $T_d$ is the current sampling time compensation PWM duty ratio; and $T_{pwm1}$ is the current sampling time pre-compensation PWM duty ratio corresponding to the current sampling time compensation voltage vector;

sign($i_a$) is used for characterizing a polarity of $i_a$, $i_a>0$ and sign($i_a$)>0 in response to the polarity of $i_a$ being positive, and $i_a<0$ and sign($i_a$)<0 in response to the polarity of $i_a$ being negative;

sign($i_b$) is used for characterizing a polarity of $i_b$, $i_b>0$ and sign($i_b$)>0 in response to the polarity of $i_b$ being positive, and $i_b<0$ and sign($i_b$)<0 in response to the polarity of $i_b$ being negative; and sign($i_c$) is used for characterizing a polarity of $i_c$, $i_c>0$ and sign($i_c$)>0 in response to the polarity of $i_c$ being positive, and $i_c<0$ and sign($i_c$)<0. in response to the polarity of $i_c$ being negative.

In the embodiments of the present disclosure, the impact of the dead-time effect on the control precision of the PMSM is eliminated or reduced, thereby enhancing the operational stability and control accuracy of the PMSM.

The embodiment of the present disclosure further provides a computer device including a memory, a processor, and computer programs stored on the memory and executable on the processor. The processor, when executing the computer programs, implements the following method: acquiring current sampling time d-axis currents and current sampling time q-axis currents corresponding to current sampling time three-phase stator currents of the PMSM, where the d-axis and the q-axis are coordinate axes in a dq coordinate system, the current sampling time d-axis currents are components of the current sampling time three-phase stator currents in the d-axis, and the current sampling time q-axis currents are components of the current sampling time three-phase stator currents in the q-axis; performing low-pass filtering on the current sampling time d-axis currents and the current sampling time q-axis currents to obtain current sampling time filtered d-axis currents and current sampling time filtered q-axis currents; acquiring, according to vector angles of current sampling time three-phase current vectors, the current sampling time filtered d-axis currents, and the current sampling time filtered q-axis currents, included angles between the current sampling time three-phase current vectors and the d-axis; acquiring current sampling time angles θ of the current sampling time three-phase current vectors in an αβ coordinate system according to the included angles between the current sampling time three-phase current vectors and the d-axis; acquiring polarities of the current sampling time three-phase stator currents according to the current sampling time angles θ; and acquiring current sampling time compensation voltage values according to current sampling time pre-compensation voltage values, current sampling time pre-compensation PWM duty ratios, a current sampling time compensation PWM duty ratio, and the polarities of the current sampling time three-phase stator currents.

The embodiment of the present disclosure further provides a computer-readable storage medium storing thereon computer programs that, when executed by a processor, implement the following method: acquiring current sampling time d-axis currents and current sampling time q-axis currents corresponding to current sampling time three-phase stator currents of the PMSM, where the d-axis and the q-axis are coordinate axes in a dq coordinate system, the current sampling time d-axis currents are components of the current sampling time three-phase stator currents in the d-axis, and the current sampling time q-axis currents are components of the current sampling time three-phase stator currents in the q-axis; performing low-pass filtering on the current sampling time d-axis currents and the current sampling time q-axis currents to obtain current sampling time filtered d-axis currents and current sampling time filtered q-axis currents; acquiring, according to vector angles of current sampling time three-phase current vectors, the current sampling time filtered d-axis currents, and the current sampling time filtered q-axis currents, included angles between the current sampling time three-phase current vectors and the d-axis; acquiring current sampling time angles θ of the current sampling time three-phase current vectors in an αβ coordinate system according to the included angles between the current sampling time three-phase current vectors and the d-axis; acquiring polarities of the current sampling time three-phase stator currents according to the current sampling time angles θ; and acquiring current sampling time compensation voltage values according to current sampling time pre-compensation voltage values, current sampling time pre-compensation PWM duty ratios, a current sampling time compensation PWM duty ratio, and the polarities of the current sampling time three-phase stator currents.

The above dead-time compensation method for a PMSM achieves the beneficial effects of being able to solve the technical problems raised in the background art.

FIGS. 2 and 4 are flow diagrams of a dead-time compensation method for a PMSM in one embodiment. Although the various steps in the flowcharts of FIGS. 2 and 4 are shown sequentially as indicated by the arrows, these steps are not necessarily performed sequentially in the order indicated by the arrows. The steps are performed in no strict order unless explicitly stated herein, and the steps may be performed in other orders. Moreover, at least some of the steps in FIGS. 2 and 4 may include sub-steps or stages that are not necessarily performed at the same time but may be performed at different times, and the order in which the sub-steps or stages are performed may not be sequential but may be performed in turn or alternation with other steps or at least some of the sub-steps or stages of other steps.

Figure 6:
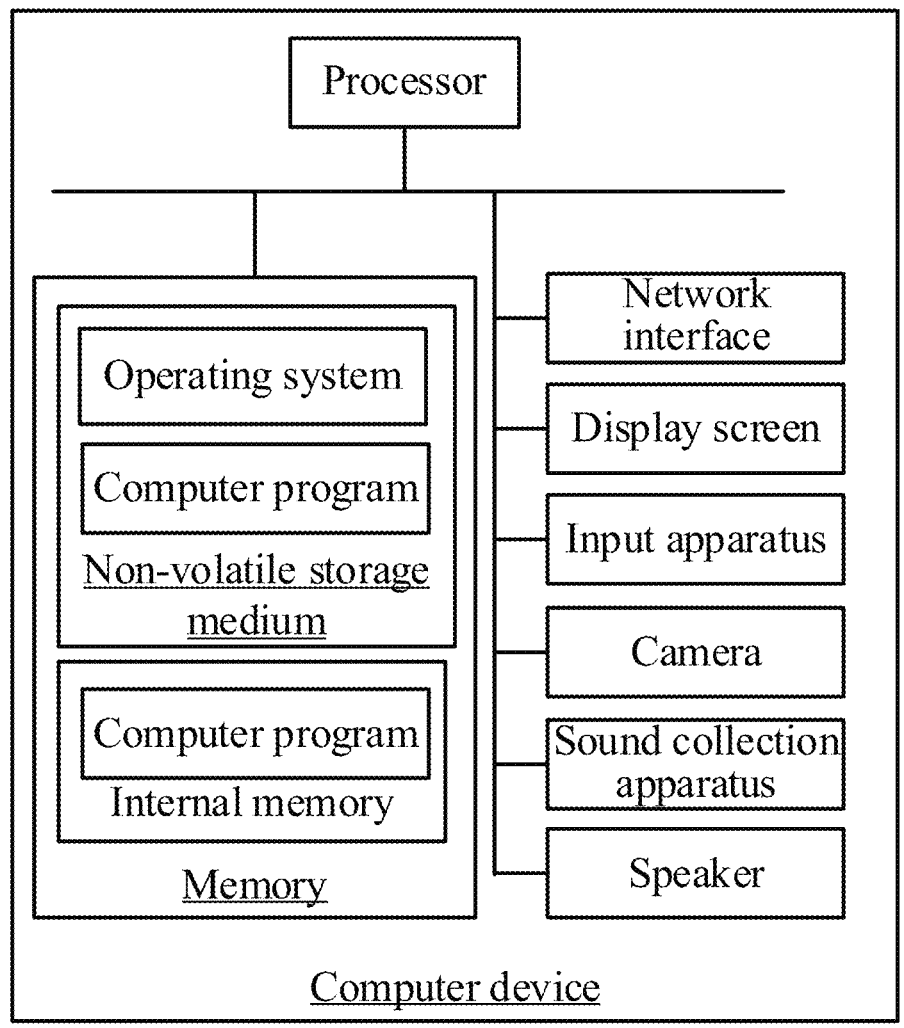
FIG. 6 is an internal structure diagram of a computer device according to an embodiment of the present disclosure.

FIG. 6 illustrates an internal structure diagram of a computer device in one embodiment. The computer device may specifically be the server 120 in FIG. 1. As shown in FIG. 6, the computer device includes a processor, a memory, a network interface, an input apparatus, and a display screen connected via a system bus. The memory includes a non-volatile storage medium and an internal memory. The non-volatile storage medium of the computer device stores an operating system and may also store computer programs that, when executed by the processor, cause the processor to implement the dead-time compensation method for a PMSM. The internal memory may also have stored therein computer programs that, when executed by the processor, may cause the processor to perform the dead-time compensation method for a PMSM. The display screen of the computer device may be a liquid crystal display screen or an electronic ink display screen; the input apparatus of the computer device may be a touch layer covered on the display screen, and may also be a key, a trackball, or a touch pad arranged on the housing of the computer device, and may also be an external keyboard, a touchpad, a mouse, or the like.

It will be appreciated by the skilled in the art that the structure shown in FIG. 6 is merely a block diagram of a part of the structure related to the solution of the present disclosure, and does not constitute a limitation of the computer device applied to the solution of the present disclosure. The specific computer device may include more or fewer components than that shown in the drawings, or may combine certain components, or may have different component arrangements.

It will be appreciated by the ordinarily skilled in the art that all or part of the flow of the methods of the embodiments described above may be implemented by computer programs instructing the associated hardware; the programs may be stored on a non-volatile computer-readable storage medium and may include the flows of the embodiments of the methods described above during which when execution. Any references to memory, storage, databases, or other media used in the embodiments provided by the present disclosure may include a non-volatile and/or volatile memory. The non-volatile memory may include read-only memory (ROM), programmable ROM (PROM), electrically programmable ROM (EPROM), electrically erasable programmable ROM (EEPROM), or flash memory. The volatile memory may include random-access memory (RAM) or external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus DRAM (RDRAM), and direct Rambus DRAM (DRDRAM).

It is noted that relational terms such as "first" and "second" may be used solely to distinguish one entity or operation from another entity or operation without necessarily requiring or implying any actual relationship or order between the entities or operations. Moreover, the terms "include", "contain", or any other variation thereof, are intended to cover a non-exclusive inclusion, such that a process, method, article, or device that includes a list of elements does not include only those elements but may include other elements not expressly listed or inherent to such process, method, article, or device. An element proceeded by "includes a . . . " does not, without more constraints, preclude the existence of additional identical elements in the process, method, article, or device that includes the element.

The foregoing are only implementations of the present disclosure to enable the skilled in the art to understand or realize the present disclosure. Various modifications to these embodiments will be readily apparent to the skilled in the art, and the generic principles defined herein may be implemented in other embodiments without departing from the spirit or scope of the present disclosure. Therefore, the present disclosure will not be limited to these embodiments shown herein but will conform to the broadest scope consistent with the principles and novel features disclosed herein.

What is claimed is:

1. A dead-time compensation method for a permanent magnet synchronous motor (PMSM), comprising:

acquiring current sampling time d-axis currents and current sampling time q-axis currents corresponding to current sampling time three-phase stator currents of the PMSM, wherein the d-axis and the q-axis are coordinate axes in a dq coordinate system, the current sampling time d-axis currents are components of the current sampling time three-phase stator currents in the d-axis, and the current sampling time q-axis currents are components of the current sampling time three-phase stator currents in the q-axis;

performing low-pass filtering on the current sampling time d-axis currents and the current sampling time q-axis currents to obtain current sampling time filtered d-axis currents and current sampling time filtered q-axis currents;

acquiring, according to vector angles of current sampling time three-phase current vectors, the current sampling time filtered d-axis currents, and the current sampling time filtered q-axis currents, included angles between the current sampling time three-phase current vectors and the d-axis;

acquiring current sampling time angles θ of the current sampling time three-phase current vectors in an αβ coordinate system according to the included angles between the current sampling time three-phase current vectors and the d-axis;

acquiring polarities of the current sampling time three-phase stator currents according to the current sampling time angles θ; and acquiring current sampling time compensation voltage values according to current sampling time pre-compensation voltage values, current sampling time pre-compensation pulse width modulation (PWM) duty ratios, a current sampling time compensation PWM duty ratio, and the polarities of the current sampling time three-phase stator currents;

wherein before the acquiring, according to the vector angles of current sampling time three-phase current vectors, the current sampling time filtered d-axis currents, and the current sampling time filtered q-axis currents, included angles between the current sampling time three-phase current vectors and the d-axis, the method further comprises acquiring the current sampling time three-phase current vectors, wherein vector values of the current sampling time three-phase current vectors are values of the current sampling time three-phase stator currents, and the vector angles of the current sampling time three-phase current vectors are current sampling time rotor angles of the PMSM;

wherein the acquiring, according to the vector angles of current sampling time three-phase current vectors, the current sampling time filtered d-axis currents, and the current sampling time filtered q-axis currents, included angles between the current sampling time three-phase current vectors and the d-axis comprises: calculating the included angles between the current sampling time three-phase current vectors and the d-axis according to a third equation, the third equation being:

$$\psi = \arctan(i_d/i_q),$$

wherein $\psi$ is the included angle between the current sampling time three-phase current vector and the d-axis; $i_d$ is the current sampling time filtered d-axis current; and $i_q$ is the current sampling time filtered q-axis current; and wherein the acquiring current sampling time angles $\theta$ comprises: calculating the current sampling time angles $\theta$ of the current sampling time three-phase current vectors in the $\alpha\beta$ coordinate system according to a fourth equation, the fourth equation being:

$$\theta = \psi + \omega$$

wherein $\psi$ is the included angle between the current sampling time three-phase current vector and the d-axis; and $\omega$ is a current sampling time rotor angle of the PMSM.

2. The method according to claim 1, wherein the performing low-pass filtering on the current sampling time d-axis currents and the current sampling time q-axis currents to obtain current sampling time filtered d-axis currents and current sampling time filtered q-axis currents comprises:
acquiring d-axis filtering coefficients of d-axis low-pass filters;
acquiring last sampling time filtered d-axis currents output by the d-axis low-pass filters;
obtaining the current sampling time filtered d-axis currents output by the d-axis low-pass filters according to the last sampling time filtered d-axis currents, the current sampling time d-axis currents, and the d-axis filtering coefficients;
acquiring q-axis filtering coefficients of q-axis low-pass filters;
acquiring last sampling time filtered q-axis currents output by the q-axis low-pass filters; and
obtaining the current sampling time filtered q-axis currents output by the q-axis low-pass filters according to the last sampling time filtered q-axis currents, the current sampling time q-axis currents, and the q-axis filtering coefficients.

3. The method according to claim 2, wherein the obtaining the current sampling time filtered d-axis currents output by the d-axis low-pass filters according to the last sampling time filtered d-axis currents, the current sampling time d-axis currents, and the d-axis filtering coefficients comprises:
calculating the current sampling time filtered d-axis currents according to a first equation, the first equation being:

$$Yd(n) = ad*Xd(n) + (1-ad)*Yd(n-1),$$

wherein Yd(n) is the current sampling time filtered d-axis current; Xd(n) is the current sampling time d-axis current; Yd(n−1) is the last sampling time filtered d-axis current; and ad is the d-axis filtering coefficient; and calculating the current sampling time filtered q-axis currents according to a second equation, the second equation being:

$$Yq(n) = aq*Xq(n) + (1-aq)*Yq(n-1),$$

wherein Yq(n) is the current sampling time filtered q-axis current; Xq(n) is the current sampling time q-axis current; Yq(n−1) is the last sampling time filtered q-axis current; and aq is the q-axis filtering coefficient.

4. The method according to claim 1, wherein the acquiring polarities of the current sampling time three-phase stator currents according to the current sampling time angles $\theta$ comprises:
acquiring angle and polarity correspondence; and
acquiring the polarities of the current sampling time three-phase stator currents according to the current sampling time angles $\theta$ and the angle and polarity correspondence,
the angle and polarity correspondence being:
in response to $$\frac{\pi}{6} \le \theta < \frac{\pi}{2},$$

the polarities of the current sampling time three-phase stator currents are positive, positive, and negative, respectively;
in response to $$\frac{\pi}{2} \le \theta < \frac{5\pi}{6},$$

the polarities of the current sampling time three-phase stator currents are negative, positive, and negative, respectively;
in response to $$\frac{5\pi}{6} \le \theta < \frac{7\pi}{6},$$

the polarities of the current sampling time three-phase stator currents are negative, positive, and positive, respectively;
in response to $$\frac{7\pi}{6} \le \theta < \frac{3\pi}{2},$$

the polarities of the current sampling time three-phase stator currents are negative, negative, and positive, respectively;
in response to $$\frac{3\pi}{2} \le \theta < \frac{11\pi}{6},$$

the polarities of the current sampling time three-phase stator currents are positive, negative, and positive, respectively;

in response to $$\frac{11\pi}{6} \le \theta < 2\pi,$$

the polarities of the current sampling time three-phase stator currents are positive, negative, and negative, respectively; and in response to $$0 \le \theta < \frac{\pi}{6},$$

the polarities or the current sampling time three-phase stator currents are positive, negative, and negative, respectively.

5. The method according to claim 1, wherein the current sampling time three-phase currents comprise $i_a$, $i_b$, and $i_c$; and the current sampling time compensation voltage values comprise $\Delta_{ua}$ corresponding to $i_a$, $\Delta_{ub}$ corresponding to $i_b$, and $\Delta_{uc}$ corresponding to $i_c$; and the acquiring current sampling time compensation voltage values according to current sampling time pre-compensation voltage values, current sampling time pre-compensation PWM duty ratios, a current sampling time compensation PWM duty ratio, and the polarities of the current sampling time three-phase stator currents comprises:

calculating the current sampling time compensation voltage values according to a fifth equation, the fifth equation being:

$$\Delta_{ua} = U_{dca} * \frac{T_d}{T_{pwma}} * \text{sign}(i_a),$$

$$\Delta_{ub} = U_{dcb} * \frac{T_d}{T_{pwmb}} * \text{sign}(i_b),$$

$$\Delta_{uc} = U_{dcc} * \frac{T_d}{T_{pwmc}} * \text{sign}(i_c),$$

wherein $U_{dca}$ is the current sampling time pre-compensation voltage value corresponding to $i_a$; $T_{pwma}$ is the current sampling time pre-compensation PWM duty ratio corresponding to $i_a$; Ta is the current sampling time compensation PWM duty ratio; and sign($i_a$) is used for characterizing a polarity of $i_a$, $i_a$>0 and sign($i_a$)>0 in response to the polarity of $i_a$ being positive, and $i_a$<0 and sign($i_a$)<0 in response to the polarity of $i_a$ being negative;

$U_{dcb}$ is the current sampling time pre-compensation voltage value corresponding to $i_b$; $T_{pwmb}$ is the current sampling time pre-compensation PWM duty ratio corresponding to $i_b$; and sign($i_b$) is used for characterizing a polarity of $i_b$, $i_b$>0 and sign($i_b$)>0 in response to the polarity of $i_b$ being positive, and $i_b$<0 and sign($i_b$)<0 in response to the polarity of $i_b$ being negative; and $U_{dcc}$ is the current sampling time pre-compensation voltage value corresponding to $i_c$; $T_{pwmc}$ is the current sampling time pre-compensation PWM duty ratio corresponding to $i_c$; and sign($i_c$) is used for characterizing a polarity of $i_c$, $i_c$>0 and sign($i_c$)>0 in response to the polarity of $i_c$ being positive, and $i_c$<0 and sign($i_c$)<0 in response to the polarity of $i_c$ being negative.

6. The method according to claim 1, wherein after the acquiring current sampling time compensation voltage values, the method further comprises:

acquiring a current sampling time compensation voltage vector according to the current sampling time compensation voltage values;

acquiring two current sampling time compensation components of the current sampling time compensation voltage vector in the αβ coordinate system; and acquiring two current sampling time compensation control components in the αβ coordinate system according to the two current sampling time compensation components.

7. The method according to claim 6, wherein the acquiring a current sampling time compensation voltage vector according to the current sampling time compensation voltage values comprises:

acquiring the current sampling time compensation voltage vector according to a sixth equation, the sixth equation being:

$$U = \frac{2}{3}\left[\text{sign}(i_a) + e^{j\frac{2}{3}\pi}\text{sign}(i_b) + e^{j\frac{4}{3}\pi}\text{sign}(i_c)\right],$$

wherein U is the current sampling time compensation voltage vector;

the acquiring two current sampling time compensation components of the current sampling time compensation voltage vector in the αβ coordinate system comprises:

acquiring the two current sampling time compensation components of the current sampling time compensation voltage vector in the αβ coordinate system according to a seventh equation, the seventh equation being:

$$U_{\alpha p} = \frac{2}{3}\left[\text{sign}(i_a) - \frac{1}{2}\text{sign}(i_b) - \frac{1}{2}\text{sign}(i_c)\right],$$

$$U_{\beta p} = \frac{2}{3}\left[\frac{\sqrt{3}}{2}\text{sign}(i_b) - \frac{\sqrt{3}}{2}\text{sign}(i_c)\right],$$

wherein $U_{\alpha p}$ and $U_{\beta p}$ are the two current sampling time compensation components of the current sampling time compensation voltage vector in the αβ coordinate system, respectively; and the acquiring two current sampling time compensation control components in the αβ coordinate system according to the two current sampling time compensation components comprises:

acquiring the two current sampling time compensation control components in the αβ coordinate system according to an eighth equation, the eighth equation being:

$$\Delta_{U_\alpha} = U_{dc} * \frac{2T_d}{T_{pwm1}} * U_{\alpha p},$$

$$\Delta_{U_\beta} = U_{dc} * \frac{2T_d}{T_{pwm1}} * U_{\beta p},$$

wherein $\Delta_{U_\alpha}$ and $\Delta_{U_\beta}$ are the two current sampling time compensation control components in the αβ coordinate system, respectively; and wherein $i_a$, $i_b$, and $i_c$ are the current sampling time three-phase currents; $T_d$ is the current sampling time compensation PWM duty ratio; and $T_{pwm1}$ is the current sampling time pre-compensation PWM duty ratio corresponding to the current sampling time compensation voltage vector;

sign($i_a$) is used for characterizing a polarity of $i_a$, $i_a>0$ and sign($i_a$)>0 in response to the polarity of $i_a$ being positive, and $i_a<0$ and sign($i_a$)<0 in response to the polarity of $i_a$ being negative;

sign($i_b$) is used for characterizing a polarity of $i_b$, $i_b>0$ and sign($i_b$)>0 in response to the polarity of $i_b$ being positive, and $i_b<0$ and sign($i_b$)<0 in response to the polarity of $i_b$ being negative; and sign($i_c$) is used for characterizing a polarity of $i_c$, $i_c>0$ and sign($i_c$)>0 in response to the polarity of $i_c$ being positive, and $i_c<0$ and sign($i_c$)<0 in response to the polarity of $i_c$ being negative.

8. A computer device, comprising a memory, a processor, and computer programs stored on the memory and executable on the processor, wherein the processor, when executing the computer programs, implements the method according to claim 1.

9. A computer-readable storage medium storing thereon computer programs, wherein the computer programs, when executed by a processor, implement the method according to claim 1.

10. A dead-time compensation apparatus for a permanent magnet synchronous motor (PMSM), comprising:
- a detection unit, configured to acquire current sampling time d-axis currents and current sampling time q-axis currents corresponding to current sampling time three-phase stator currents of the PMSM, wherein the d-axis and the q-axis are coordinate axes in a dq coordinate system, the current sampling time d-axis currents are components of the current sampling time three-phase stator currents in the d-axis, and the current sampling time q-axis currents are components of the current sampling time three-phase stator currents in the q-axis;
- a filtering unit, configured to perform low-pass filtering on the current sampling time d-axis currents and the current sampling time q-axis currents to obtain current sampling time filtered d-axis currents and current sampling time filtered q-axis currents;
- an angle acquisition unit, configured to acquire, according to vector angles of current sampling time three-phase current vectors, the current sampling time filtered d-axis currents, and the current sampling time filtered q-axis currents, included angles between the current sampling time three-phase current vectors and the d-axis;
- the angle acquisition unit being further configured to acquire current sampling time angles θ of the current sampling time three-phase current vectors in an αβ coordinate system according to the included angles between the current sampling time three-phase current vectors and the d-axis;
- a polarity acquisition unit, configured to acquire polarities of the current sampling time three-phase stator currents according to the current sampling time angles θ; and
- a compensation unit, configured to acquire current sampling time compensation voltage values according to current sampling time pre-compensation voltage values, current sampling time pre-compensation pulse width modulation (PWM) duty ratios, a current sampling time compensation PWM duty ratio, and the polarities of the current sampling time three-phase stator currents;

wherein the vector angles of the current sampling time three-phase current vectors are current sampling time rotor angles of the PMSM;

wherein the acqution of the included angles between the current sampling time three-phase current vectors and the d-axis comprises: calculating the included angles between the current sampling time three-phase current vectors and the d-axis according to a third equation, the third equation being:

$\psi = \arctan(i_d/i_q)$, wherein $\psi$ is the included angle between the current sampling time three-phase current vector and the d-axis; $i_d$ is the current sampling time filtered d-axis current; and $i_q$ is the current sampling time filtered q-axis current; and wherein the acqution of the current sampling time angles θ comprises: calculating the current sampling time angles θ of the current sampling time three-phase current vectors in the αβ coordinate system according to a fourth equation, the fourth equation being:

$\theta = \psi + \omega$, wherein $\psi$ is the included angle between the current sampling time three-phase current vector and the d-axis; and $\omega$ is a current sampling time rotor angle of the PMSM.

* * * * *